United States Patent
Chao

(10) Patent No.: US 10,228,821 B2
(45) Date of Patent: Mar. 12, 2019

(54) METHOD OF INPUTTING A MESSAGE TO AN APPLICATION BY USING ONLINE CONTENT

(71) Applicant: KIKA TECH (HK) HOLDINGS CO., LIMITED, Kowloon (HK)

(72) Inventor: Hsu-Kuang Chao, New Taipei (TW)

(73) Assignee: KIKA TECH (HK) HOLDINGS CO., LIMITED, Kowloon (HK)

( * ) Notice: Subject to any disclaimer, the term of this patent is extended or adjusted under 35 U.S.C. 154(b) by 612 days.

(21) Appl. No.: 14/877,935

(22) Filed: Oct. 8, 2015

(65) Prior Publication Data

US 2016/0103564 A1 Apr. 14, 2016

Related U.S. Application Data

(60) Provisional application No. 62/061,683, filed on Oct. 8, 2014.

(51) Int. Cl.

| | |
|---|---|
| *G06F 3/048* | (2013.01) |
| *G06F 3/0482* | (2013.01) |
| *G06F 3/0488* | (2013.01) |
| *G06F 3/01* | (2006.01) |
| *G06F 3/0484* | (2013.01) |
| *G06F 17/30* | (2006.01) |
| *G06F 3/0481* | (2013.01) |

(52) U.S. Cl.
CPC ............ *G06F 3/0482* (2013.01); *G06F 3/018* (2013.01); *G06F 3/04842* (2013.01); *G06F 3/04886* (2013.01); *G06F 17/30345* (2013.01); *G06F 3/0481* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 2007/0050337 A1* | 3/2007 | Venkataraman | ...... G06F 3/0237 |
| 2009/0049132 A1* | 2/2009 | Livne Gutovski | ... G06Q 10/107 |
| | | | 709/206 |
| 2012/0173222 A1* | 7/2012 | Wang | .................... G06F 17/273 |
| | | | 704/2 |
| 2014/0115070 A1* | 4/2014 | Virtanen | ........... G06F 17/30038 |
| | | | 709/206 |
| 2016/0006856 A1* | 1/2016 | Bruno | ............... H04M 1/72547 |
| | | | 715/809 |

(Continued)

OTHER PUBLICATIONS

Peter Clark, Implementation of Voice Input to Computer Applications, Dec. 1986, JIT, 1, 4, pp. 40-56 (Year: 1986).*

(Continued)

*Primary Examiner* — Tam T Tran
(74) *Attorney, Agent, or Firm* — Anova Law Group, PLLC

(57) ABSTRACT

A method of generating a message from dynamic online contents for inputting to an application via an inputting platform, such as a method editor (IME) or a virtual keyboard (VKB), is disclosed, wherein the method links to online contents via a command through the inputting platform and dynamically generates a new content by replacing a portion of the original content from the online content with a different content in a database if the portion of the original content matches a predefined rule, wherein the new content is sent to the input field of the application for inputting a message to the application.

17 Claims, 15 Drawing Sheets

(56) References Cited

U.S. PATENT DOCUMENTS

2016/0140112 A1* 5/2016 Masuko ............... G06F 17/212
704/3

OTHER PUBLICATIONS

Hi Li et al., Modeap: Moving Desktop Application to Mobile Cloud Service, Jun. 29, 2014, Springer Science & Business Media, Edition or vol. 19; pp. 563-571 (Year: 2014).*

* cited by examiner

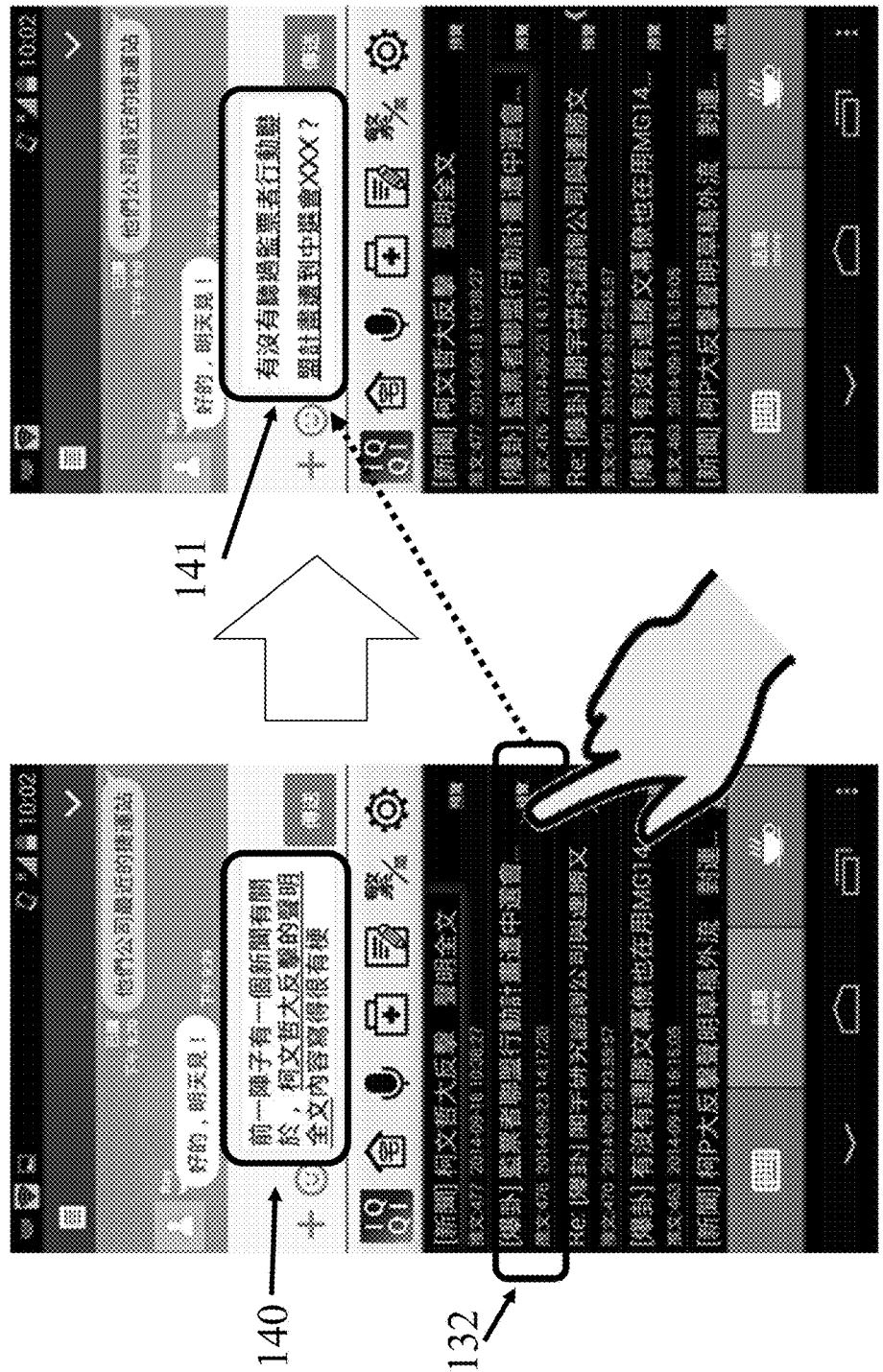

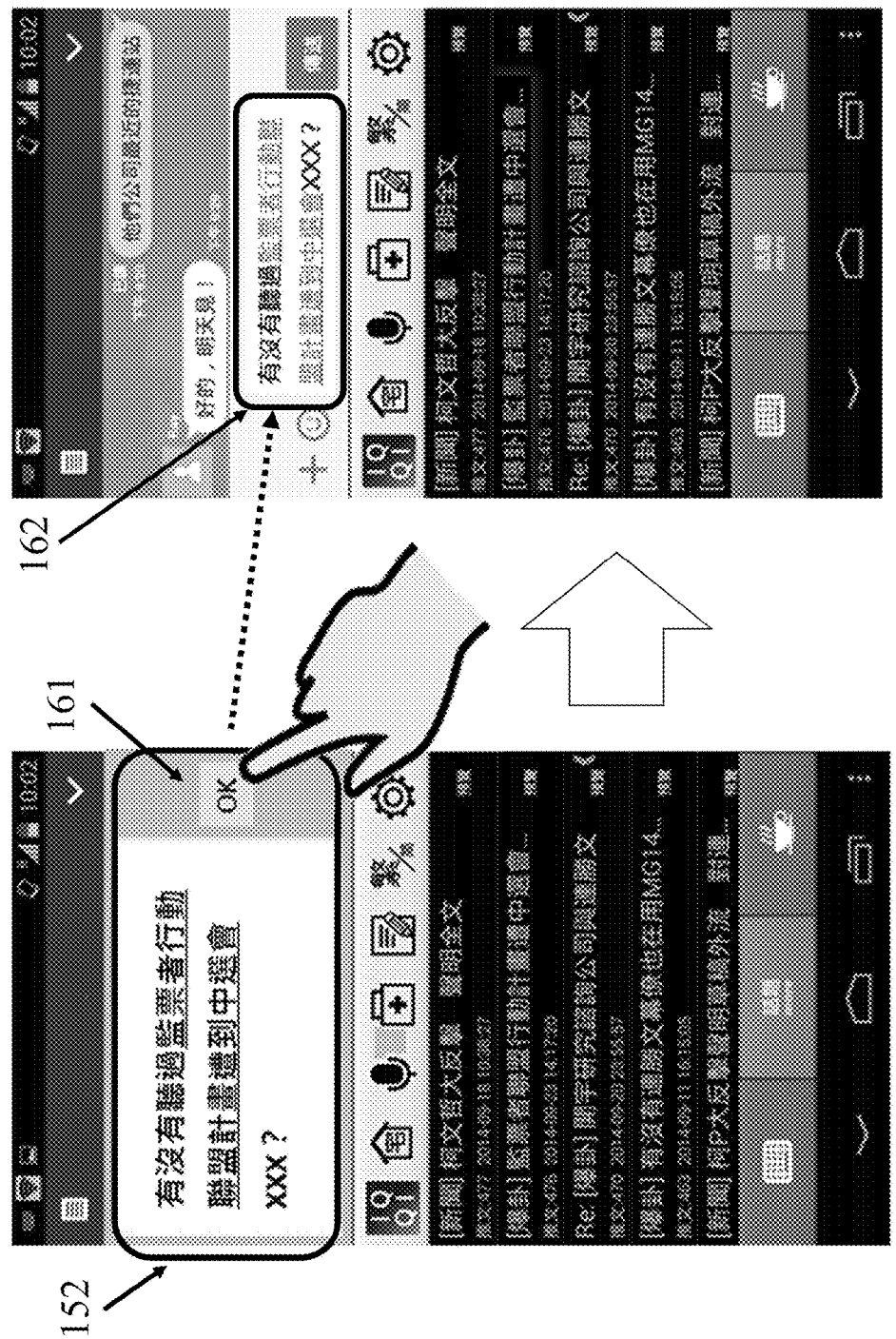

and the client electronic device sends a new content to the input field of the application according to the received second content to input a message to the application.

METHOD OF INPUTTING A MESSAGE TO AN APPLICATION BY USING ONLINE CONTENT

CROSS-REFERENCES TO RELATED APPLICATIONS

This application claims the benefit of U.S. Provisional Patent Application No. 62/061,683 filed on Oct. 8, 2014, which is hereby incorporated by reference herein and made a part of specification.

BACKGROUND OF THE INVENTION

1. Field of the Invention

The invention relates in general to a method for inputting a message to an application and, in particular, to a method for inputting a message to an application using online content.

2. Description of the Prior Art

Input Method Editor (IME) is the software program that helps a user to use the keyboard to input text in a particular language. IME is originally used to enter text in different languages using thousands of different characters (e.g., Japanese, Chinese, or Korean) on keyboards with far fewer keys. Today, IME is widely used in smart phone or touch-screen based input devices to speed up the text inputting for many languages. Virtual Keyboard (VKB) is an on-screen keyboard that helps user to input text. All IMEs on touch-screen based input devices are presented as VKB. User will use IME or VKB to enter the right key codes to get the desired words or sentences.

For applications such as instant messaging applications, Line, WeChat or Messenger, IME or VKB is used for inputting messages. However, inputting messages into the applications may take a long time especially when a user tries to think of a topic for communication with his/her friend. As a result, what is needed is a fast, easy and automatic way to dynamically generate messages for inputting to the applications for chatting with friends.

SUMMARY OF THE INVENTION

The present invention discloses a method for dynamically generating messages by using online content via input method editor (IME) or virtual keyboard (VKB); the method links to online content via an input method editor (IME) or a virtual keyboard (VKB) or any input devices, wherein IME/VKB can be used to find online contents and generate messages dynamically by modifying the original content from websites.

In one embodiment, a method for inputting a message for an application running in an electronic device is disclosed, wherein the method comprises: detecting an engagement of an input field of the application displayed on a screen of the electronic device; displaying an inputting platform on the screen to input a message; obtaining a list of contents via a command through the inputting platform and displaying the list of contents for a user to select; and modifying a first selected content if at least one portion of the first selected content matches at least one pre-defined rule, so as to generate a first new content for inputting a message to the application via the input field of the application.

In one embodiment, modifying the first selected content comprising replacing a first portion of the first selected content with a different content in a database if the first portion of the first selected content matches a first pre-defined rule.

In one embodiment, modifying the first selected content comprising adding a second content in front of or after a first portion of the first selected content to the first selected content if the first portion of the first selected content matches a first pre-defined rule.

In one embodiment, modifying the first selected content comprising deleting a first portion of the first selected content to the first selected content if the first portion of the first selected content matches a first pre-defined rule.

In one embodiment, the pre-defined rule is based on the portion of a first selected content with at least one of the following: time, location, content category, content source, application category, user preference. In one embodiment, the pre-defined rule is stored in a database In one embodiment, the first new content comprise at least of the following: a text string, a sticker, a photo and an audio file.

In one embodiment, the inputting platform is a virtual keyboard (VKB) or an input method editor (IME).

In one embodiment, the command is activated by clicking an icon displayed on the inputting platform.

In one embodiment, the command is activated by inputting a special text string on the inputting platform.

In one embodiment, the list of contents is obtained by surfing at least one website from the inputting platform directly.

In one embodiment, the list of contents is obtained from a server, the server surfing at least one website to provide the list of contents to the inputting platform.

In one embodiment, the first selected content comprises a title that is displayed on the screen for the user to select and a content associated with the title.

In one embodiment, the list of contents is obtained from a database in the electronic device or a remote server.

In one embodiment, the list of contents comprises a plurality of subject titles, wherein a first subject title is selected from one of the plurality of subject titles, wherein a new prefix or postfix text string is chosen from the database according to a rule defined in the database to replace an original prefix or postfix text string in the first subject title.

In one embodiment, the first new content is sent to the input field of the application directly.

In one embodiment, the first new content is sent to an editor within the inputting platform instead of the input field of the application for generating a second new content, wherein the second new content is sent to the input field of the application from the editor when a confirmation command is activated.

In one embodiment, a system is disclosed, wherein the system comprises: a server, configured to obtain a list of contents from at least one website, modifying a first content of the list of contents if at least one portion of the first content matches at least one pre-defined rule so as to generate a second content; a client electronic device configured to run an application with an input field for inputting a message to the application; wherein the server provides the second content to the client electronic device when the server receives a request from the client electronic device, and the client electronic device sends a new content to the input field of the application according to the received second content to input a message to the application.

In one embodiment, the client electronic device further modifying the received second content to generate the new content.

In one embodiment, modifying the first selected content comprising replacing a first portion of the first selected content with a different content in a database if the first portion of the first selected content matches a first pre-defined rule.

Other objects, technical contents, features and advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein:

FIG. 2B to FIG. 2E depict an example to each step of FIG. 2A;

FIG. 3B to FIG. 3G depict an example to each step of FIG. 3A.

DETAILED DESCRIPTION OF THE INVENTION

The detailed explanation of the present invention is described as following. The described preferred embodiments are presented for purposes of illustrations and description, and they are not intended to limit the scope of the present invention.

The invention illustrates a method for generating a message using a virtual keyboard or input method editor. This method is provided for helping user to input a message from database or online contents via input method editor (IME) or virtual keyboard (VKB) on any input devices, in particular for use with a portable electronic device having a touch screen, such as a mobile phone.

Figure 1A:
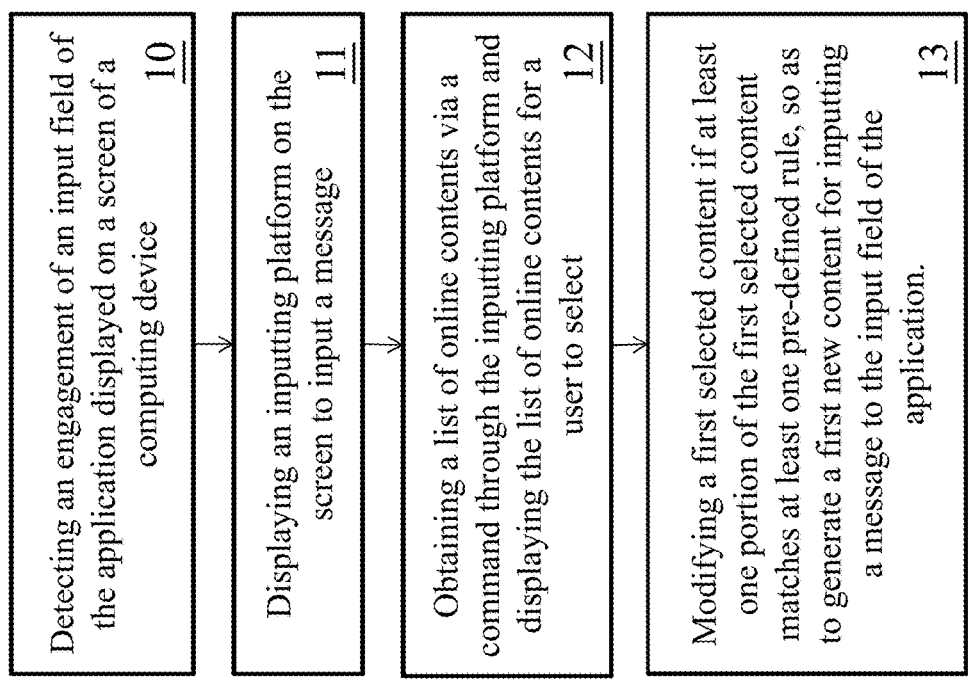
FIG. 1A shows a flow diagram for generating a message using an inputting platform.

FIG. 1A shows a flow diagram for generating a message using an inputting platform. In step 10, detecting an engagement of an input field of the application displayed on a screen of an electronic device; in step 11, displaying an inputting platform on the screen to input a message; in step 12, obtaining a list of online contents via a command through the inputting platform and displaying the list of online contents for a user to select; and in step 13, Modifying a first selected content if at least one portion of the first selected content matches at least one pre-defined rule, so as to generate a first new content for inputting a message to the application via the input field of the application. The inputting platform can be a virtual keyboard or input method editor or any other suitable way. Each content can include text, symbols, sticker or a photo, an audio file or any other suitable forms. In one embodiment, the command is activated by clicking an icon displayed on the inputting platform. In one embodiment, the first selected content comprises a title that is displayed on the screen for the user to select and a content associated with the title. The electronic device can be a mobile phone, tablet, notebook, computer, smart TV, or any portable electronic device having a touch screen, and etc. In one embodiment, the pre-defined rule is defined further according to at least one of the following factors associated with the first selected content: the published time of the first selected content, content category of the first selected content (such as politics, entertainment, etc.), content source of the first selected content (such as from different websites), application category (such as Line, WORD, or a special purpose software such as a court software), the electronic device type (such as desktop computer, iphone or android mobile phone), the location of the electronic device (such as Taiwan, Japan, etc.), the current time (such as morning or night time), the user type of the inputting platform (such as male/female, age or hobbies of the user). In one embodiment, the pre-defined rule is stored in a database.

The FIG. 1B to FIG. 1I are used for illustrating an example based on an instant messaging application. The present invention can be applied to any application that has an input field for inputting a message. The following examples use text as the main content, however, the present invention is not limited to inputting text. Each content for forming a message can include text, symbols, sticker or a photo, an audio file or any other suitable forms.

Figure 1B:
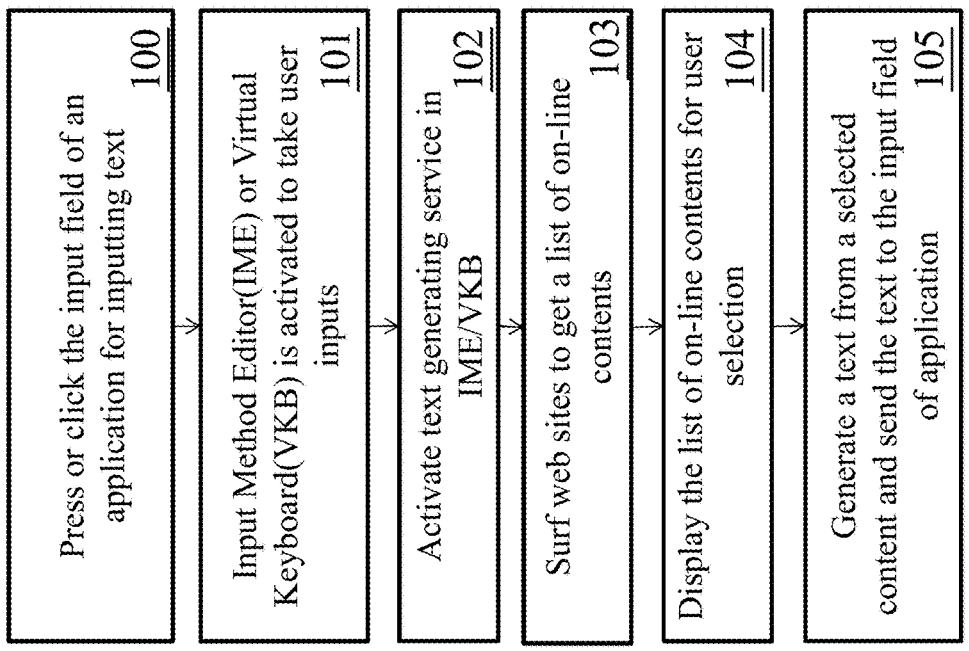
FIG. 1B shows a flow diagram for generating a dynamic Text using a virtual keyboard or input method editor for an instant message application.

FIG. 1B shows a flow diagram for generating a dynamic text using a virtual keyboard or input method editor through an input field of an application, such as Line. FIG. 1C to FIG. 1I are used for illustrating an embodiment corresponding to steps of the flow diagram of FIG. 1B.

Figure 1C:
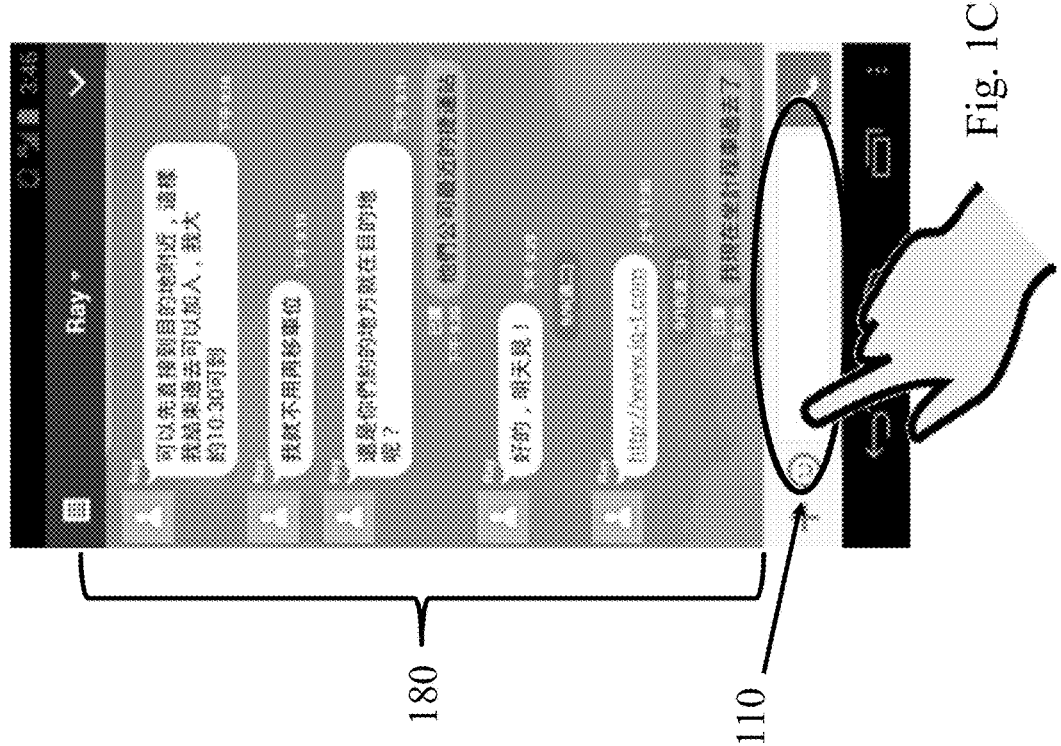
FIG. 1C to FIG. 1I depict an example to each step of FIG. 1B.

As shown in FIG. 1B, in step 100, a user presses or clicks the input field of the application for inputting text; as illustrated in FIG. 1C, an instant messaging application LINE is running for exchanging instant messages, wherein there are some existing messages 180 that has been exchanged and displayed on the screen, and then the input filed 110 of the LINE application is pressed by the user for inputting a message.

Figure 1D:
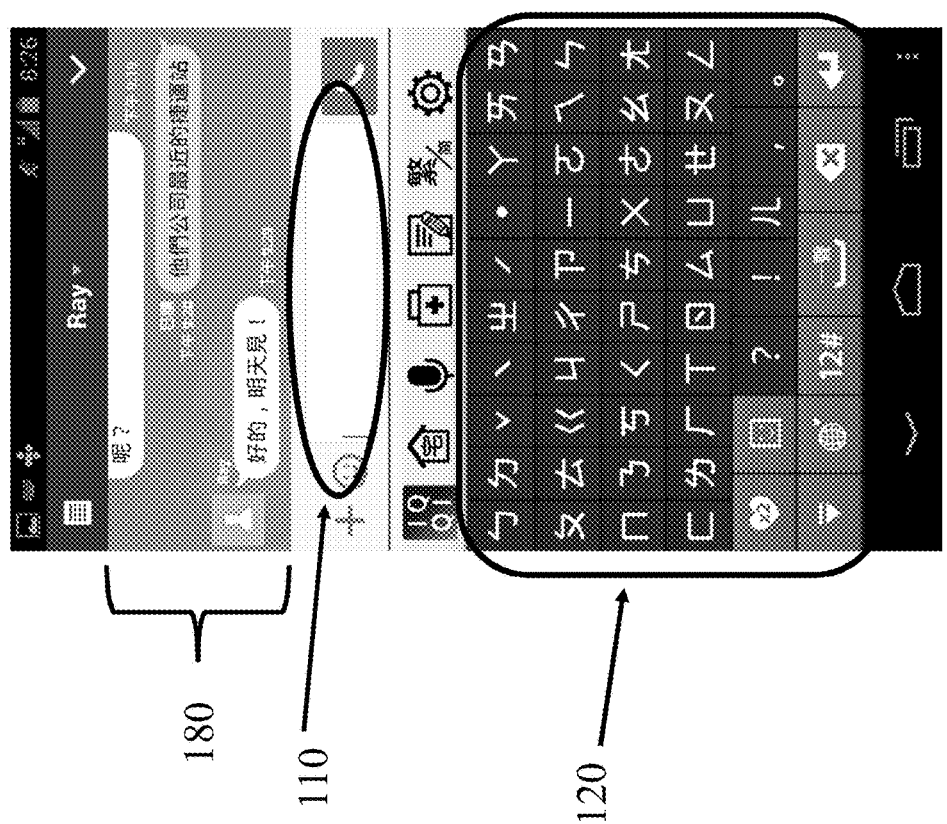

In step 101 of FIG. 1B, an inputting platform such as Input Method Editor (IME) or Virtual Keyboard (VKB) 120, will be activated to take user inputs after the input filed 110 of the LINE application is pressed by the user; as illustrated in FIG. 1D, a Virtual Keyboard (VKB) 120 is displayed under the input filed 110 of the LINE application for inputting a message. Please note that the virtual keyboard may not appear if the hardware keyboard is used for inputting a message.

Figure 1E:
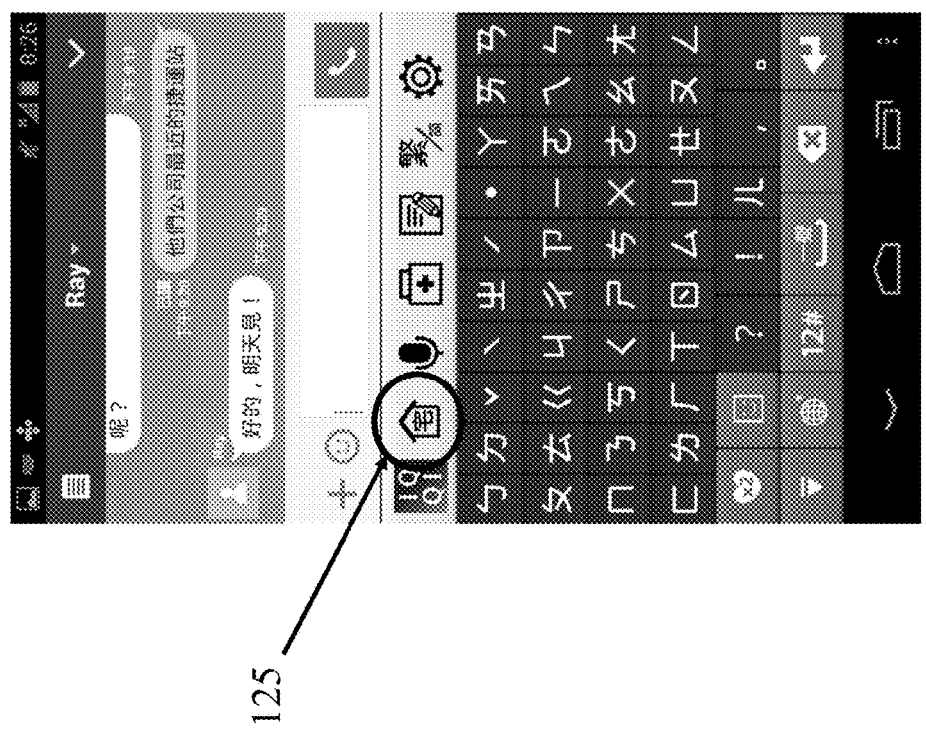

In step 102 of FIG. 1B, a text generating service is activated by pressing a predefined button 125 on the Virtual Keyboard 120 as shown in FIG. 1E. Please note that there are many ways to activate the text generating service in the inputting platform such as Input Method Editor (IME) or Virtual Keyboard (VKB), for example, by making a special gesture or inputting command codes (e.g., "@CHAT"). In one embodiment, a command can be taken from the inputted text, for example, when certain keywords in the inputted text string matches with pre-defined keywords in the database, the text generating service will be activated automatically.

Figure 1G:
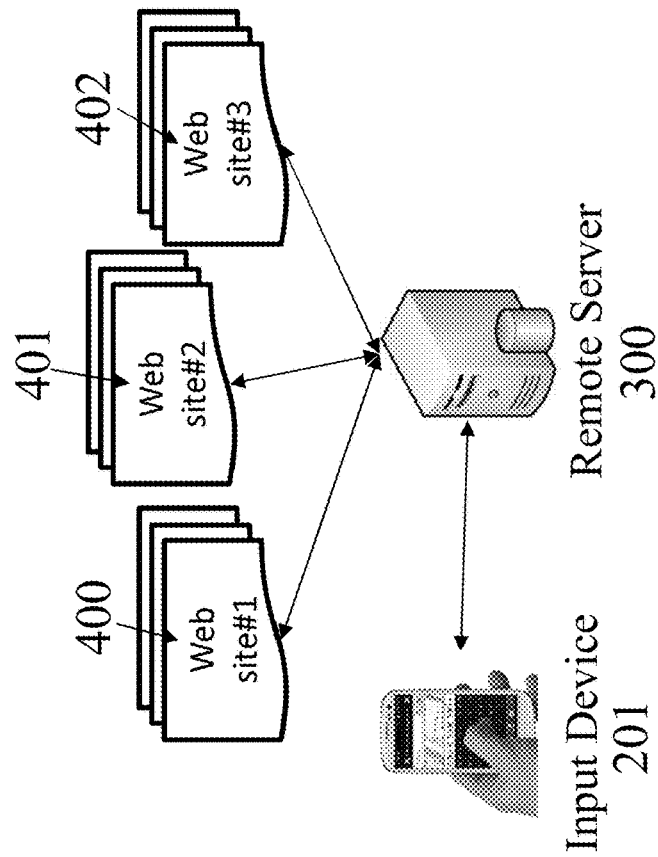
Figure 1F:
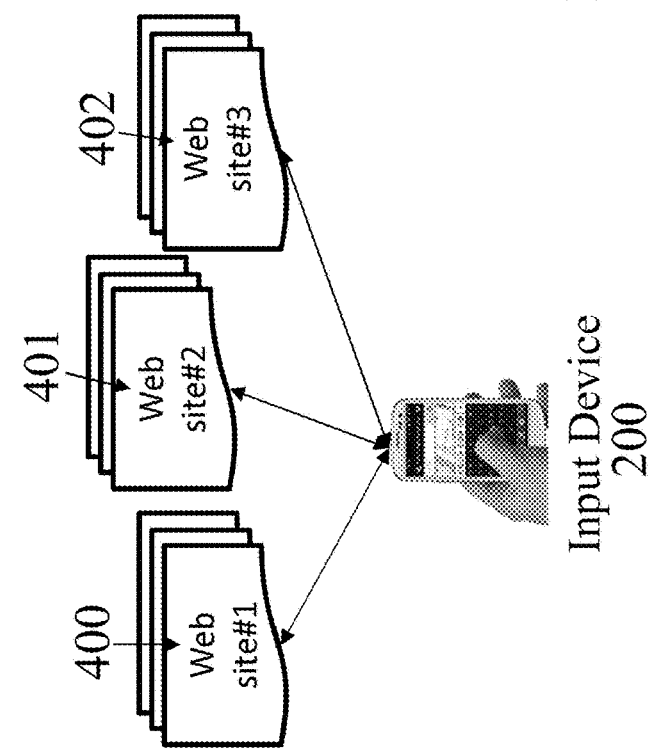

In step 103 of FIG. 1B, after the text generating service is activated, websites, such as blogs or RSS (Really Simple Syndication) feed sites, will be surfed to get a list of online contents therefrom. Please note that the websites can be pre-defined initially and can be dynamically added or deleted from time to time as needed. There are many ways to get the list of contents from the websites. As shown in FIG. 1F, input device, such as a mobile phone 200, can get online contents from websites, 400, 401, 402, directly. Alternatively, as shown in FIG. 1G, input device, such as a mobile phone 201, can get contents from at least one remote server, wherein the at least one remote server 300 surfs online contents from websites, 400, 401, 402, and provides the contents to the mobile phone 201.

Figure 1H:
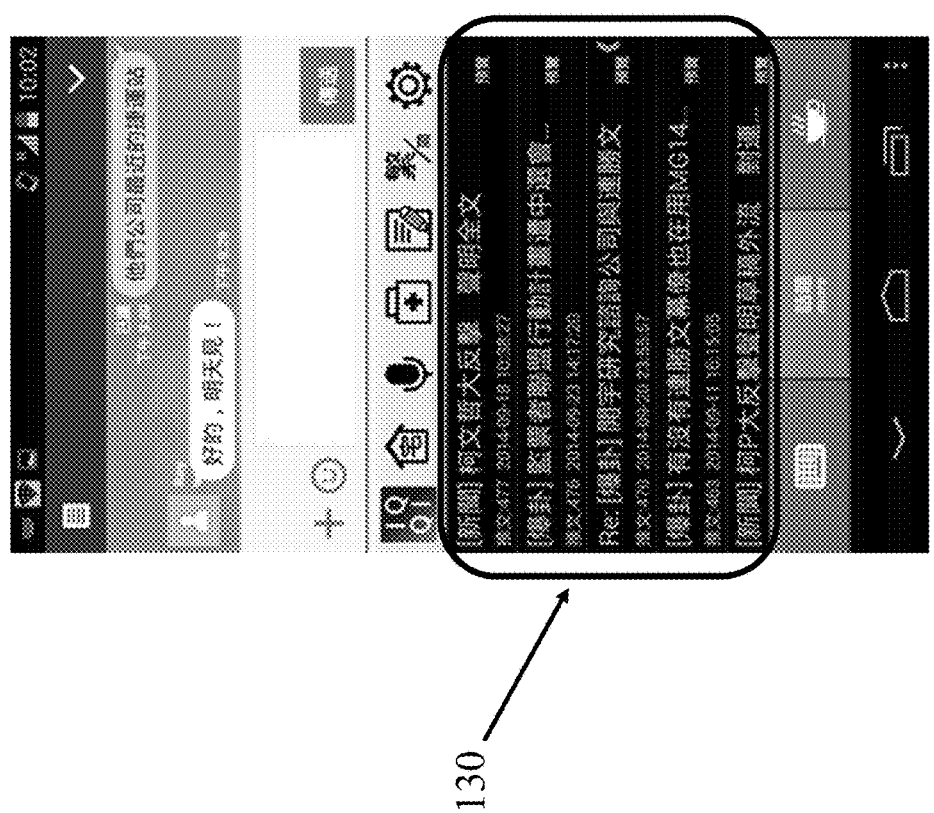

In step 104 of FIG. 1B, the list of online contents from the websites or the remote server will be displayed on the screen for the user to select. As shown in FIG. 1H, in one embodiment, a list of subject titles 130 from websites is displayed for the user to select. By doing so, the user can select an interested subject title for inputting a message in the instant messaging application, LINE.

Figure 1I:
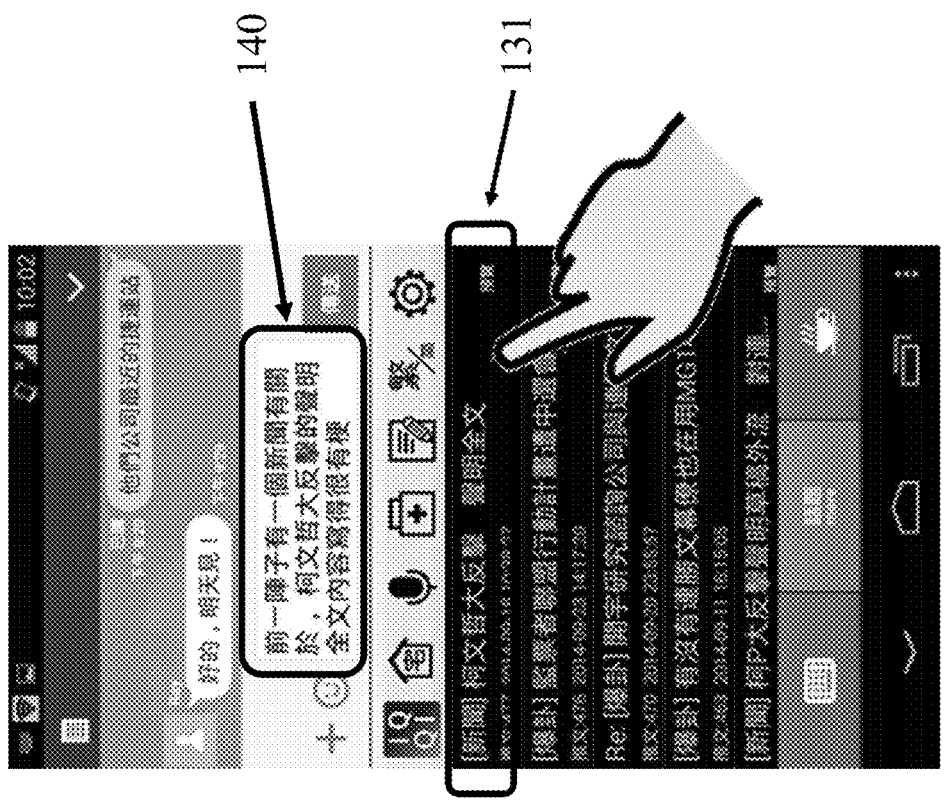

In step 105 of FIG. 1B, generate a new text from user selected content and send the new text to the input field of application. As shown in FIG. 1I, when the user selects an interested subject title 131: "[新聞] 柯文哲大反擊聲明全文," from the list of the online contents displayed on the screen, the subject title will be modified by the method to generate a resulting string 140: "前一陣子有篇新聞有關於, 柯文哲大反擊的聲明全文內容寫的很有梗" which is inputted to the input filed of the application, as shown in FIG. 1I.

In one embodiment, the resulting text generated from a selected online content in step 105 of FIG. 1B can be sent to the input field of application directly.

Figure 2A:
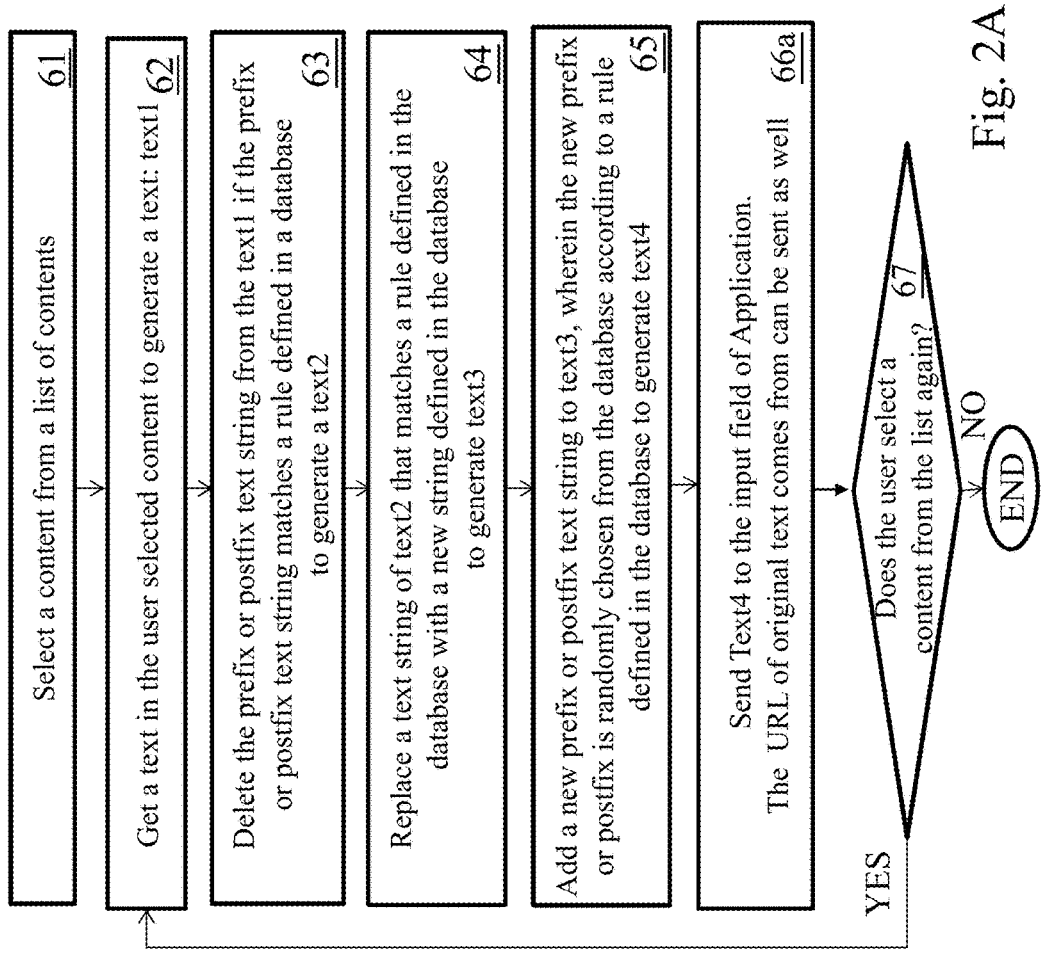
FIG. 2A shows a flow to generate a new text according to a content from websites or remote servers and send the new text to the input field of application directly.
Figures 2B, 2C:
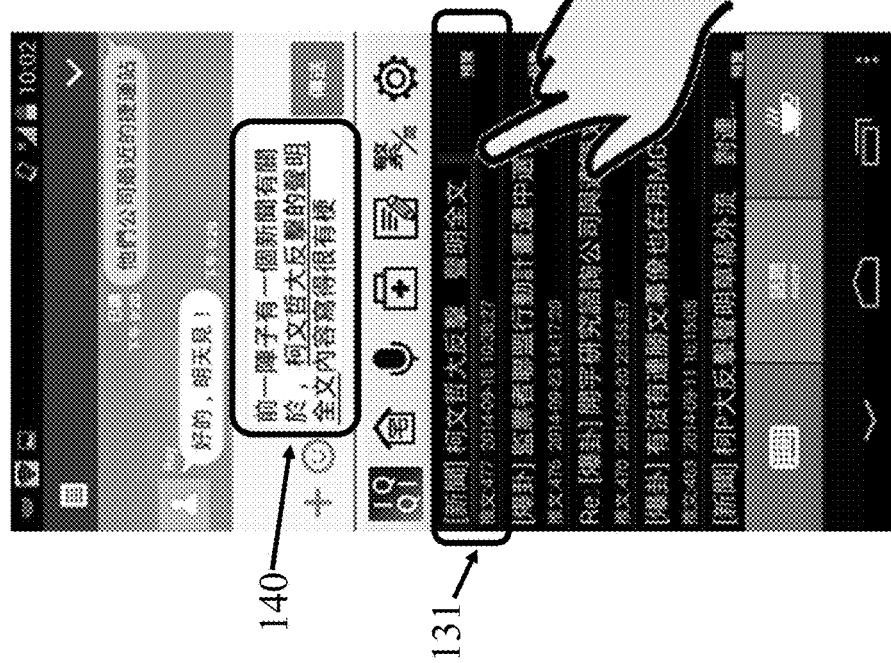

FIG. 2A shows a flow to generate a new text according to an online content from the websites or remote servers, wherein the new text is sent to the input field of application directly. Along with the FIG. 2A, FIG. 2B shows the appearance of the LINE application on a mobile phone after the steps, 62, 63, 64, 65 and 66a of FIG. 2A are executed. FIG. 2C shows the resulting text after steps, 62, 63, 64, 65 and 66a, of FIG. 2A are executed. Please note that each of the steps, 63, 64, and 65 will modify the text based on a rule in a database. As shown in FIG. 2B, once the user selects an interested content 131 from the list of the contents displayed on the screen, it will see the final resulting text 140 displayed in the input field of the application automatically.

In step 61 of FIG. 2A, an interested content from the list of the contents displayed on the screen is selected by the user. As shown in FIG. 2B, the interested content selected by the user is indicated by a block 131, wherein the text inside the block 131 can be highlighted when the user selects it.

In step 62 of FIG. 2A, the text of the interested content, which is in a form of a subject title, in this embodiment, is read as "[新聞] 柯文哲大反擊聲明全文" which is designated as text1. That is, after the step 62 is executed, the result text is "[新聞] 柯文哲大反擊 聲明全文," which is shown in block 62R of FIG. 2C.

In step 63 of FIG. 2A, deleting the prefix and/or postfix text strings from the text1 if they match the rules defined in a database. For example, the text1 contains a prefix text string "[新聞]", wherein the prefix text string [新聞] starts with a left bracket "[" and ends with a right bracket "]", therefore, the prefix text string "[新聞]" will be deleted. After deleting "[新聞]," the resulting text becomes "柯文哲大反擊聲明全文" which is designated as text2.

That is, after the step 63 is executed, the result text, text2, is "柯文哲大反擊 聲明全文" as shown in block 63R of FIG. 2C. Please note that the present invention is not limited to any particular pattern, such as [ . . . ], any other pattern, such as ( . . . ), can be defined in the database for deleting as well.

In step 64 of FIG. 2A, replacing a text string in text2 if the text string matches a rule defined in Database. For example, there is a space (which can be one or more space characters) between "擊" and "聲" in the text2, and the space made of one or more space characters matches a rule defined in database for replacing said one or more space characters with "的" (in Chinese). After replacing said one or more space characters with "的" in text2, the text2: "柯文哲大反擊 聲明全文", will be changed to a new text: "柯文哲大 反擊的聲明全文" which is designated as text3. That is, after the step 64 is executed, the result text is "柯文哲大反擊的聲明全文" as shown in block 64R of FIG. 2C.

In step 65 of FIG. 2A, adding a new prefix or a new postfix text string to the text3. A new prefix and postfix are chosen from a database, in one embodiment, the new prefix and postfix can be randomly chosen from the database according to a rule defined in the database. After adding a new prefix string "前一陣子有篇新聞 有關於," and a new postfix text string "內容寫的很有梗" to the text3, text3 will be changed to a new text: "前一陣子有篇新聞有關於, 柯文哲大反擊的聲明全文內容寫的很有梗" which is designated as text4. That is, after the step 64 is executed, the result text is "前一陣子有篇新聞有關於, 柯文哲大反擊的聲明全文內容寫的很有梗" as shown in block 65R of FIG. 2C. Please note that only a new prefix or only a new postfix can be added to the text3, or a new prefix and a new postfix can be added to the text3 at the same time.

In step 66a of FIG. 2A, text4 is sent to the input field of application 140 as shown in FIG. 2B. That is, after the step 66a is executed, the result text "前一陣子有篇新聞有關於, 柯文哲大反擊的聲明全文內容寫的很有梗" is sent to the input field of application 140 of FIG. 2B, as shown in block 66R of FIG. 2C. In one embodiment, the URL of website where the original online contents come from can be sent to the input field of application as well. That is, after the step 66a is executed, the result text "前一陣子有篇新聞有關於, 柯文哲大反擊的聲明全文內容寫的很有梗 https://www.ptt.cc/bbs/3362.html" is sent to the input field of application 140 of FIG. 2B.

Please note that the same item on the list of contents can be selected for more than one time, and different resulting texts can be generated. That is, if the user selects the first subject title "[新聞] 柯文哲大反擊 聲明全文" again, a different resulting text can be generated. By doing so, if the user is focusing on only one of the subject title, the user can select the same subject tile more than one time until the final resulting text is what the user wants.

In step 67 of FIG. 2A, if the user wants to select another interested content, such as another subject tile in the list of contents displayed on the screen, the user can continue to select that subject title on the screen, and then the method will go back to step 62 for generating a new text based on the newly selected content on the screen, for example, the user selects $2^{nd}$ content from the list of the contents, wherein the original subject of the $2^{nd}$ content selected by the user is: "[爆卦] 監票者聯盟行動計畫邊中選會 . . . " (in Chinese), as shown in a block 132 in FIG. 2D. After the steps, 62, 63, 64, 65, and 66a, are executed, a new text: "有沒有聽過監票者行動聯盟計畫遭到中選會 XXX ?" (in Chinese) will be generated, and the new text: "有沒有聽過監票者行動聯盟計畫遭 到中選會 XXX ?" is displayed in the input filed of the application as shown in a block 141 in FIG. 2E.

In step 67 of FIG. 2A, if the text generation is completed for the user, the flows ends; if the user selects another subject title, the method will go back to step 62 to generate another new text for inputting to the input field of the application.

In steps, 63, 64, and 65, the database can be located either in the electronic device itself running the application or at a remote server. The text string can be symbols, words, phrases, etc.; the matching rule can be based on the text string itself as well as the combination of time, location, content category, content source, application category, user preference, etc.

In one embodiment, in step 105 of FIG. 1B, the generated text4 will be put in an IME or VKB text editor first. Then, the user can edit the text4 in the editor and then send the resulting text from the editor to the input filed of the application.

In the aforementioned step 66a in FIG. 2A, text4 is sent to the input field of application directly. In another embodiment, instead of sending the text4 to the input field of application directly, the text4 can be inputted to an IME/VKB text Editor first, then user can edit the text4 in the editor and sending the resulting text to the input field of application from the editor.

Figure 3A:
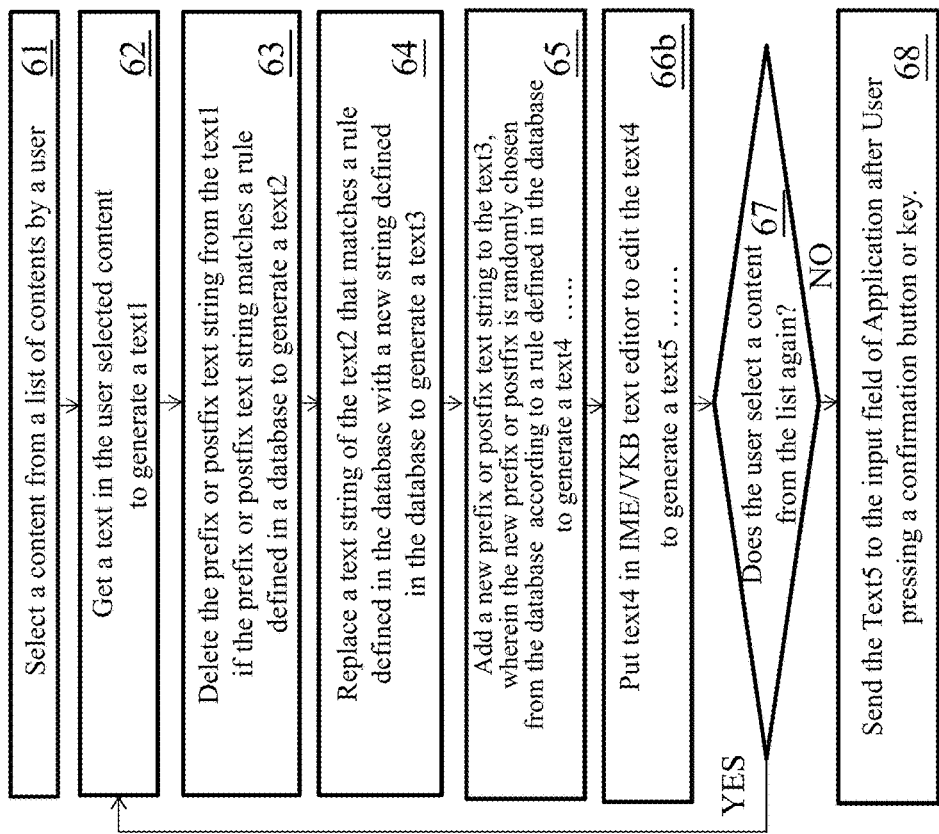
FIG. 3A shows a flow to generate a new text according to a content from websites or remote servers and send the new text to an editor within IME/VKB first instead of sending the new text to the input field of application directly.

FIG. 3A shows a flow to generate a text based on the online contents from the websites or the remote servers, wherein the resulting text, text4, generated by step 65 is sent to an IME/VKB text editor for editing, instead of sending the text4 to the input field of application directly. Finally, a confirmation button or key can be pressed to send the new text from the editor to the input field of application.

Comparing FIG. 3A with FIG. 2A, steps, 61, 62, 63, 64, 65, and 67, are the same in both FIG. 3A and FIG. 2A; the step 66a of FIG. 2A is replaced with 66b in FIG. 3A; and step 68, in FIG. 3A, sends the resulting text from the IME/VKB text editor to the input field of the application.

Figures 3B, 3C:
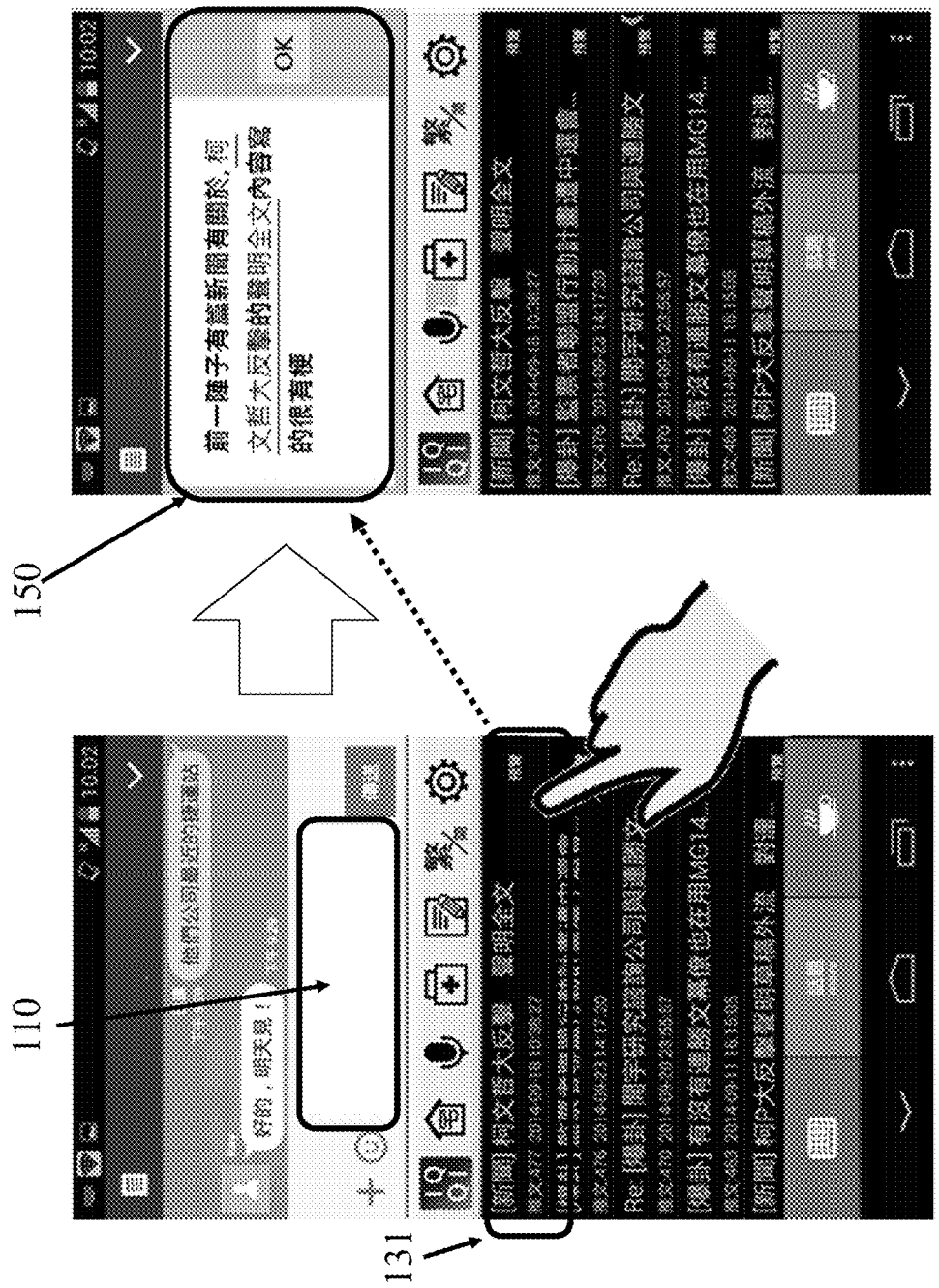

Taking the same example as shown in FIG. 2B, after step 65 is completed in FIG. 3A, the resulting text, text4, is: "前一陣子有篇 新聞有關於, 柯文哲大反擊的聲明全文內容寫的很有梗" Instead of sending the text4 to the input field of the application, step 66b of FIG. 3A will put the text4: "前一陣子有篇新聞 有關於, 柯文哲大反擊的聲明全文內 容寫的很有梗" in the IME/VKB text editor first, as shown in block 150 of FIG. 3C. Then, the text4 is edited in block 150 of FIG. 3C to generate a new text, text5. As shown in FIG. 3C, the text editor is appeared on top of the VKB and blocks out a message display area of the application so that the user has a larger space to edit the text.

Figures 3D, 3E:
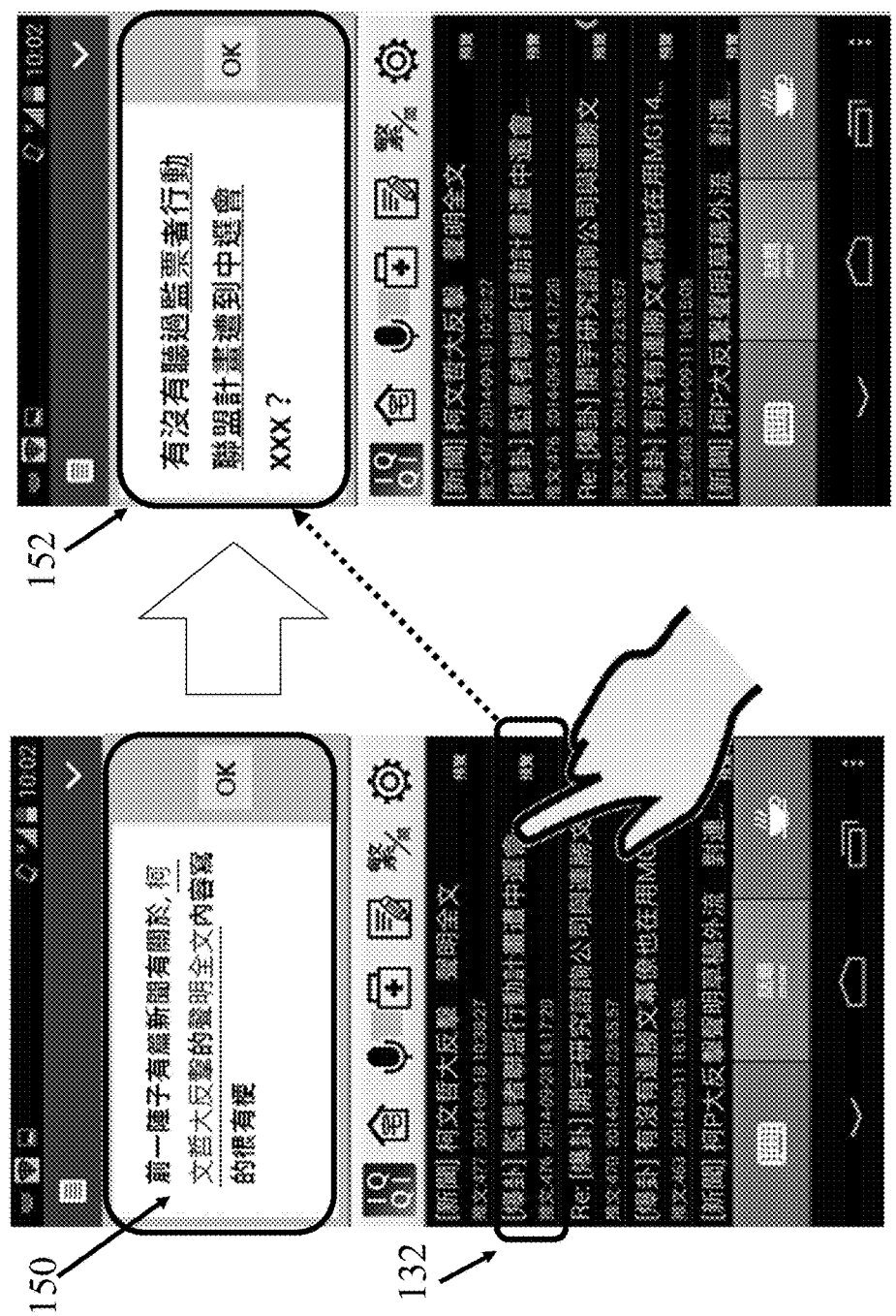

In step 67, if the user selects another interested content from the list on the screen, the method will go back to step 62 for generating a new text based on the newly selected content on the screen. For example, the user select $2^{nd}$ content from the list of online contents on the screen, as shown in the block 132 of FIG. 3D, wherein the original text in the $2^{nd}$ content is "[爆卦] 監票者聯盟行動計畫遭中選會 ..." (in Chinese). After the steps, 62, 63, 64, 65, and 66b, are executed, a new text is generated as the text4: "有沒有 聽過監票者行動聯盟計畫遭到中選會 XXX?" (in Chinese), which is sent to the editor for editing, as shown in a block 152 of FIG. 3E Please note that a same item on the list of contents can be selected for more than one time, and different resulting texts can be generated each time the user selects the same item. For example, if the user selects the first subject title "[新聞] 柯文哲大反擊 聲明 全文" again, a different resulting text can be generated (Not shown). That is, when the user is focusing on only one of the subject tile, the user can select the same subject tile more than one time until the final resulting text is what the user wants.

In step 67, if the user does not select a new content from the list of the contents displayed on the screen, step 68 will be performed. In step 68, the text5 generated by the editor will be sent to the input field of application, as shown in a block 162 of FIG. 3G, after a confirmation button 161 in FIG. 3F, or a command key, is pressed by the user. In one embodiment, the URL of the website where the original online contents come from can be sent to the input field as well.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the Claims appended hereto and their equivalents.

What is claimed is:

1. A method for inputting a message for an application running on an electronic device that includes a screen, the method comprising:
    activating and displaying an inputting platform, on the screen of the electronic device, wherein a message is inputted to an input field of the application;
    receiving a command, by the electronic device, through the inputting platform on the screen to activate a text generating function;
    getting access to and surfing, through the activated text generating function and without an input to the input field, one or more preset online websites and generate and display, on the screen, a list of contents taken from online contents of the one or more preset online websites;
    receiving a selection command in response to a first content from the list of contents being selected on the screen of the electronic device, the first content including a title;
    modifying the first selected content, including modifying only part of the title, when at least one portion of the first selected content matches at least one pre-defined rule stored in a database, wherein modifying the first selected content comprising replacing a first portion of the first selected content with a second content in a database when the first portion of the first selected content matches a first pre-defined rule; and
    generating a first new content and inputting the first new content to the input field of the application.

2. The method according to claim 1, wherein modifying the first selected content comprising adding a second content in front of or after a first portion of the first selected content to the first selected content when the first portion of the first selected content matches a first pre-defined rule.

3. The method according to claim 1, wherein modifying the first selected content comprising deleting a first portion of the first selected content from the first selected content when the first portion of the first selected content matches a first pre-defined rule.

4. The method according to claim 1, wherein the at least one pre-defined rule is defined according to at least one of the following factors associated with the first selected content including: a published time of the first selected content, a content category of the first selected content, a content source of the first selected content, an application category, a user type of the inputting platform, an electronic device type, a location of the electronic device, or a current time.

5. The method according to claim 1, wherein the first new content comprises at least one of the following: a text string, a sticker, a photo or an audio file.

6. The method according to claim 1, wherein the inputting platform is a virtual keyboard (VKB) or an input method editor (IME).

7. The method according to claim 1, wherein the command is received in response to clicking an icon displayed on the inputting platform.

8. The method according to claim 1, wherein the list of contents is obtained by getting access to and surfing the one or m ore preset online websites from the inputting platform directly.

9. The method according to claim 1, wherein the list of contents is obtained from a server, the server being configured to get access to and surf the one or more preset online websites and send the list of contents to the inputting platform.

10. The method according to claim 1, wherein the first selected content comprises the title that is displayed on the screen for the user to select and a content associated with the title.

11. The method according to claim 1, wherein the list of contents is obtained from a database in the electronic device or a remote server.

12. The method according to claim 1, wherein a new prefix or postfix text string is chosen from the database according to a rule defined in the database to replace an original prefix or postfix text string in the title.

13. The method according to claim 1, wherein the first new content is sent to an editor within the inputting platform to generate a second new content, wherein the second new content is sent to the input field of the application from the editor in response to receiving a confirmation command.

14. The method according to claim 1, wherein: the command is received to activate the text generating function in response to a gesture inputted through the inputting platform.

15. The method according to claim 1, further comprising:
receiving another selection command in response to the first content from the list of the contents being selected for more than one time on the screen of the electronic device;
modifying the first selected content, including modifying only part of the title, when at least one portion of the first selected content matches another pre-defined rule stored in the database; and
generating a new content that is different from the first new content and inputting the new content to the input field of the application.

16. A system, comprising:
a client electronic device configured to run an application with an input field for inputting a message to the application and activate a text generating function in response to receiving a command through an inputting platform displayed on a screen of the client electronic device;
a server configured to obtain a list of contents taken from one or more online websites that are preset in response to the text generating function being activated, wherein:
the client electronic device is further configured to receive and display, on the screen, the list of contents returned from the server and send a first content selected from the list of contents to the server;
the server is further configured to modify the first content, including modifying only part of a title contained in the first content, when at least one portion of the first content matches at least one pre-defined rule to generate a second content, wherein modifying the first selected content comprises replacing a first portion of the first selected content with a second content in a database when the first portion of the first selected content matches a first pre-defined rule;
the server is further configured to send the second content to the client electronic device in response to receiving a request from the client electronic device; and
the client electronic device is further configured to display the second content through an inputting platform on the screen of the client electronic device, and send and input a new content to the input field of the application according to the second content after receiving a confirmation command.

17. The system according to claim 16, wherein the client electronic device is configured to modify the second content to generate the new content.

* * * * *